United States Patent [19]
Karr

[11] Patent Number: 5,596,509
[45] Date of Patent: Jan. 21, 1997

[54] PASSIVE INFRARED BULLET DETECTION AND TRACKING

[75] Inventor: Thomas J. Karr, Alamo, Calif.

[73] Assignee: The Regents of the University of California, Oakland, Calif.

[21] Appl. No.: 241,907

[22] Filed: May 12, 1994

[51] Int. Cl.$^6$ ........................................ G06F 17/00
[52] U.S. Cl. ............................................. 364/516
[58] Field of Search ................... 364/516, 517; 235/411, 412, 413, 417; 382/103; 356/4, 29, 3

[56] References Cited

U.S. PATENT DOCUMENTS

| | | | |
|---|---|---|---|
| 3,562,423 | 2/1971 | Murphy | 382/103 |
| 3,638,025 | 1/1972 | Dishington et al. | 364/516 |
| 4,094,225 | 6/1978 | Greenwood | 235/411 |
| 4,221,966 | 9/1980 | Kerr | 235/411 |
| 4,402,009 | 8/1983 | Rathjens | 235/412 |
| 5,027,413 | 6/1991 | Barnard | 382/103 |
| 5,034,986 | 7/1991 | Karmann et al. | 382/103 |
| 5,150,426 | 9/1992 | Banh et al. | 382/103 |
| 5,283,839 | 2/1994 | Edelman et al. | 382/103 |

OTHER PUBLICATIONS

Gonzalez et al; "Image Processing"; 1987.
Deheng et al; "A New Measuring Method of the Projectile Velocity Using Flash Shadowgraph System", IEEE 1994.

*Primary Examiner*—Ellis B. Ramirez
*Attorney, Agent, or Firm*—Henry P. Sartorio

[57] ABSTRACT

An apparatus and method for passively detecting a projectile such as, for example, a bullet using a passive infrared detector. A passive infrared detector is focused onto a region in which a projectile is expected to be located. Successive images of infrared radiation in the region are recorded. Background infrared radiation present in the region is suppressed such that second successive images of infrared radiation generated by the projectile as the projectile passes through the region are produced. A projectile path calculator determines the path and other aspects of the projectile by using the second successive images of infrared radiation generated by the projectile. The present invention, in certain embodiments, also determines the origin of the path of the projectile and takes a photograph of the area surrounding the origin and/or fires at least one projectile at the area surrounding the origin of the path of the projectile.

65 Claims, 8 Drawing Sheets

PASSIVE INFRARED BULLET DETECTION AND TRACKING

GOVERNMENT RIGHTS

The United States Government has rights in this invention pursuant to Contract No. W-7405-ENG-48 between the United States Department of Energy and the University of California.

TECHNICAL FIELD

The present invention relates generally to infrared detection and tracking and more particularly to a passive infrared detection of projectiles such as for example, bullets.

BACKGROUND OF THE INVENTION

The detection and tracking of objects such as airplanes, missiles, or other very large projectiles can be achieved using radar. Radar detection and tracking can be used to locate the aircraft, detect incoming missiles, and aim radar controlled guns. However, the use of radar is not without disadvantages. In radar detection and tracking, the radar must radiate energy. The energy emitted by the radar enables enemies or other interested parties to determine that radar is being used and further to determine the location of the source of the radar.

Detection and tracking of certain objects has also been achieved using infrared radiation (IR) detection. IR detection has the advantage that is passive. That is, IR detection devices do not emit radiation, but instead, detect heat or infrared radiation emitted from an object. Thus, because an IR detector does not emit radiation, an object being detected and tracked using an IR detector can not easily determine the source or location of the IR detector.

IR detection of projectiles such as missiles has been accomplished by observing hot-gas plumes emitted from the rear of projectiles, and the rear surfaces of the projectiles which are heated by the hot-gases. Unfortunately, the detection and tracking of the rear surfaces of projectiles has the disadvantage that its geometry is only well suited to detecting and tracking one's own projectile as it moves away from its origin wherein the IR detector is located. Although IR detection of a missile moving towards an observer has been accomplished, IR detection of a projectile is not particularly well suited to detecting and tracking a projectile as it moves towards the IR detector.

Some modern IR detectors have recently been developed with sufficient sensitivity to detect items such as leading edges of airplane wings. IR detection of such items is accomplished by observing the leading edge of the projectile as it is warmed due to friction occurring while the projectile passes through the atmosphere. However, such detectors are at present only useful for detecting and tracking the leading edges of large projectiles or very large surface areas such as are found on airplane wings. That is, the IR emitted from smaller surfaces or projectiles is difficult to observe due to reduced intensity and also because the ratio of the projectile's infrared radiation vs. the infrared radiation emitted by the background is extremely low. Therefore, using present methods of IR detection, the IR emitted from smaller projectiles can not be discerned from constant background IR emissions.

Thus, a need exists for a detection and tracking method and device, which does not emit radiation, can be used to detect and track items without regard to the direction in which the projectile is moving, and which is not limited to detecting and tracking only the leading edges of large projectiles or very large surface areas.

SUMMARY OF THE INVENTION

It is, therefore, an object of the present invention to provide a detection and tracking method and device, which does not emit radiation, can be used to detect and track items without regard to the direction in which the projectile is moving, and which is not limited to detecting and tracking only the leading edges of large projectiles or very large surface areas. This object has been accomplished by observing and recording successive images of the mid wave infrared radiation present in a region in which a projectile is expected to be located using a passive infrared detector with very short exposure time and a high frame rate. The background infrared radiation present in the successive images is suppressed thereby leaving only images of infrared radiation emitted by a projectile as the projectile passes through the region being observed.

By using a passive infrared detector with a very short exposure rate and a high frame rate, and suppressing background infrared radiation, the present invention provides for the detection and tracking of even very small projectiles such as, for example, bullets. Additionally, the present invention can detect and track a projectile moving through the observed region regardless of the direction in which the projectile is heading.

A projectile path calculator determines the path of the projectile by using the successive images of infrared radiation generated by the projectile. The present invention, in certain embodiments, also determines the origin of the path of the projectile and takes a photograph of the area surrounding the origin and/or fires at least one projectile at the area surrounding the origin of the path of the projectile.

Thus, the present invention provides a detection and tracking method and device, which does not emit radiation, can be used to detect and track items without regard to the direction in which the projectile is moving, and which is not limited to detecting and tracking only the leading edges of large projectiles or very large surface areas.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
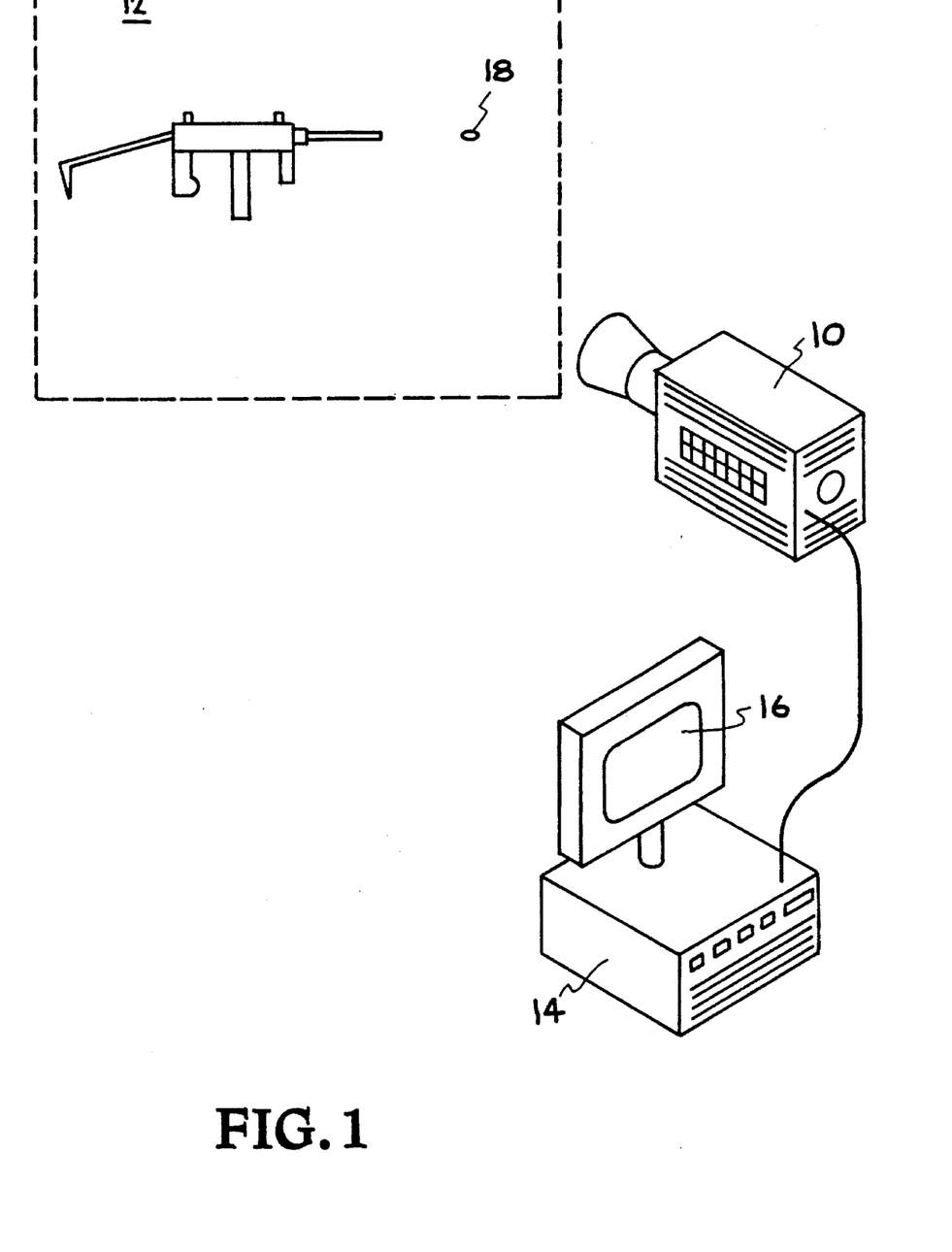
FIG. 1 is an illustration of an arrangement showing a passive infrared detector focused onto a region in which a projectile is expected to be located in accordance with the present invention.

With reference next to FIG. 1, a typical arrangement of the present invention is shown in which passive infrared detector 10 is focused onto a region 12 in which a projectile is expected to be located. Passive infrared detector 10 is coupled to a data processor 14. Data processor 14, in turn, is connected to a display unit 16. In the present embodiment, passive infrared detector 10 observes a series of successive images of infrared radiation emitted from region 12. The images observed by passive infrared detector 10 are sent to data processor 14. Data processor 14 records the images received from detector 10, subtracts the images from each other to cancel out background infrared radiation, and calculates the path of bullet 18. Although subtraction of successive images is used in the present embodiment to cancel out background radiation, the present invention is also well suited to the use of numerous other methods of background infrared radiation image suppression well known in the art.

With reference still to FIG. 1, data processor 14 generates an image showing the calculated path of bullet 18. The image generated by data processor 14 is then displayed on display unit 16. In certain embodiments, data processor 14 also determines the origin of bullet 18. The present invention is typically able to detect a bullet and calculate the path and origin of the bullet in approximately 0.05 second after the bullet is fired. In other embodiments, the present invention includes a camera or projectile launcher for photographing the area proximate to the origin of bullet 18, or for firing at least one projectile into the area proximate to the origin of bullet 18. Furthermore, the present invention is able to detect and track bullets even when the present invention is in motion such as, for example, when mounted on an armored personnel carrier or other moving or movable object.

Figure 2:
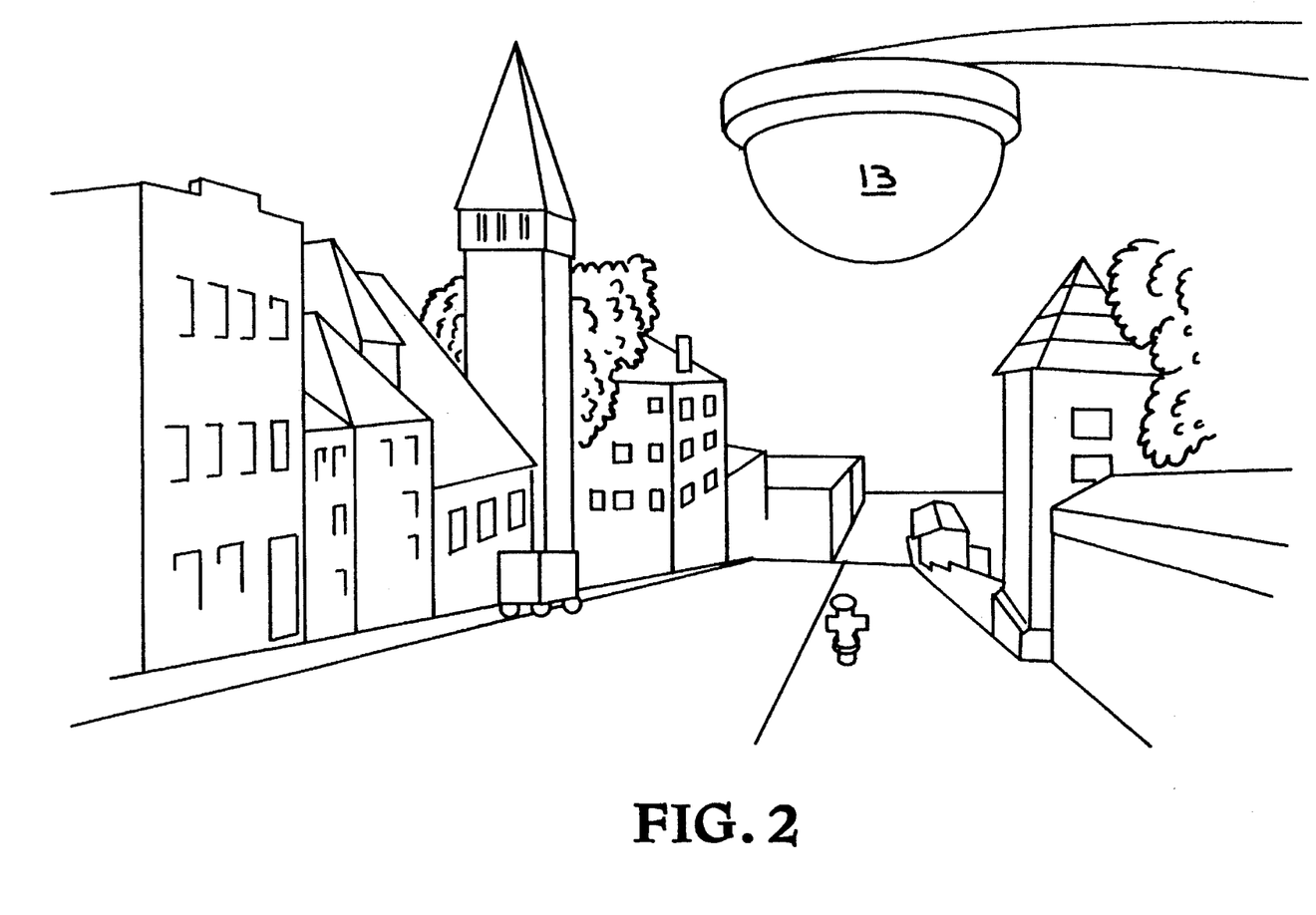
FIG. 2 is an illustration of a "fisheye" staring array passive infrared detector having a 360 degree field of view in accordance with the present invention.

With reference again to FIG. 1, the above described operation of the present invention will now be set forth in detail. In the present embodiment, passive infrared detector 10 is a staring array passive infrared detector having a very short exposure time and a high frame rate. Specifically, in the present embodiment the exposure rate of staring array passive infrared detector 10 is in the range of approximately 1 millisecond, and the frame rate is in the range of approximately 200 frames per second. Additionally, in the present embodiment, passive staring array infrared detector 10 is an InSb, indium-antimonide, detector, however, the present invention is also well suited to the use of other types of staring array passive infrared detectors well known in the art. Additionally, the present invention is also suited for use with passive infrared detectors capable of achieving scan rates comparable to the approximate 200 frames per second frame rate and the 1 millisecond exposure rate of present staring array passive infrared detector 10. Furthermore, although the staring array passive infrared detector of the present embodiment observes a region 12, the present invention is also well suited to using a "fisheye" staring array passive infrared detector 13 as shown in FIG. 2 wherein a 360 degree field of view is observed simultaneously.

With reference still to FIG. 1, optimally staring array passive infrared detector 10 will have an exposure rate equal to the time it takes for the infrared radiation image of bullet 18 to move across one pixel of staring array passive infrared detector 10. In so doing, in every frame taken of region 12, the infrared radiation emitted from bullet 18 will be recorded on a separate pixel of staring array passive infrared detector 10. As a result, when the data processor 14 subtracts the images from successive frames to cancel out background infrared radiation, successive frames will have the infrared image of bullet 18 in a slightly different position. Thus, the subtraction process will result in a clearly defined path of bullet 18 through region 12.

With reference again to FIG. 1, as a bullet such as, for example, bullet 18 passes through the atmosphere, the air at the nose of bullet 18 stagnates and is heated by compression. The heated air surrounding the nose of bullet 18 heats bullet 18. Eventually, bullet 18 reaches an equilibrium temperature which is approximately the same as the heated air located at the nose of bullet 18. The temperature to which bullet 18 is heated depends upon the velocity of bullet 18. In the case of a bullet traveling at 1 kilometer per second, the bullet reaches a temperature of approximately 525 degrees Celsius. Typically, bullets travel in the range of approximately 250–1000 meters per second, and heat up in the range of approximately 60–525 degrees Celsius. Additionally, bullets of most caliber sizes reach their equilibrium temperature in the range of approximately 0.05 second or less. Although the present embodiment specifically deals with the detection and tracking of bullets, it will be apparent to those of ordinary skill in the art that the present invention is also well suited for the detection of other projectiles and objects.

With reference still to FIG. 1, although passive infrared detecter 10 observes infrared radiation emitted from bullet 18 as bullet 18 passes through region 12, the amount of background radiation present in region 12 masks or obscures the infrared radiation emitted by the bullet thereby rendering detection and tracking of the bullet extremely difficult. However, as described below, the present invention suppresses background infrared radiation thereby making it possible to detect and track projectiles such as bullets.

Referring still to FIG. 1, in the present invention, staring array passive infrared detector 10 observes infrared radiation emitted in the mid wave infrared radiation (MWIR) band. Specifically, in the present embodiment, staring array passive infrared detector 10 observes infrared radiation in the range of approximately the 4.3–5 micron band in daylight, and in the range of approximately the 3–4.1 micron band at night. By observing in the MWIR band the signal-to-background ratio is optimized. That is, the contrast between the infrared radiation emitted from bullet 18 and the infrared radiation emitted by the background in region 12 is maximized. Although the present embodiment observes in the MWIR band, the present invention is also well suited to numerous variations in the parameters of the infrared radiation band being observed.

With reference still to FIG. 1, data processor 14 receives image data representing the series of successive images of infrared radiation observed by passive staring array infrared detector 10. Data processor 14 records the images in short term memory. Next, using differencing circuitry, data processor 14 then subtracts from each successive image the image which was observed immediately prior thereto. In so doing, the relatively unchanging or constant background infrared radiation present in region 12 is canceled out. Only changes in the infrared radiation which occur from one successive image to the next will remain after the subtraction process. Therefore, because bullet 18 changes position from one successive image the next, an image showing substantially only the infrared radiation emitted by bullet 18 will remain after the subtraction process.

Figure 3A:
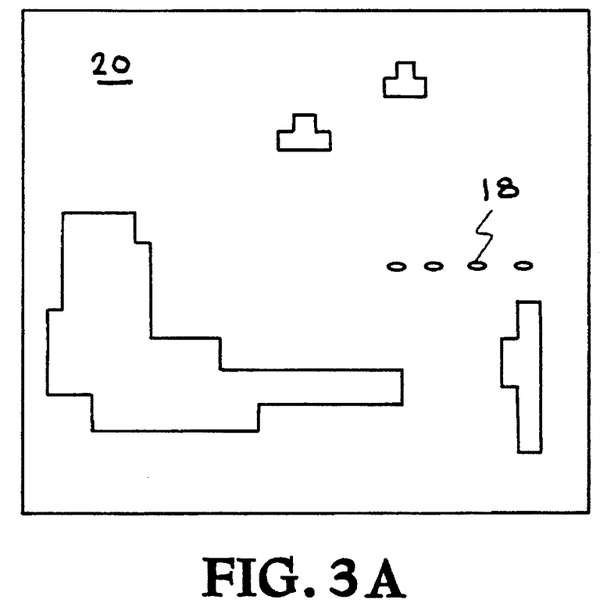
FIG. 3A shows overlapped successive images of infrared radiation present in a region, including infrared radiation emitted from a bullet, wherein the images were taken with a staring array passive infrared detector having a very short exposure time and a high frame rate in accordance with the present invention.

With next to FIG. 3A, an image 20 depicting infrared radiation present in region typical region such as, for example, region 12 of FIG. 1, including infrared radiation emitted from bullet 18, is shown. Image 20 is composed of several overlapped successive images of region 12, wherein the images were obtained using staring array passive infrared detector 10.

Figure 3B:
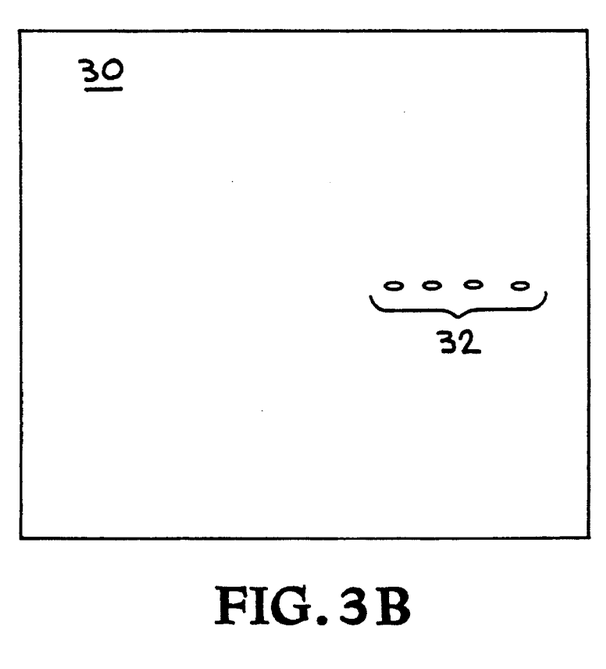
FIG. 3B shows overlapped successive images of infrared radiation present in a region, wherein background infrared radiation present in the region has been almost completely canceled out thereby leaving substantially an image of infrared radiation emitted from a bullet in accordance with the present invention.

With reference now to FIG. 3B, a second image 30 is shown wherein background infrared radiation present in region 12 has been almost completely canceled out by data processor 14 of FIG. 1 thereby leaving substantially only an image 32 of infrared radiation emitted from bullet 18. Thus, as shown in FIG. 3B, using the present invention, detection and tracking of a bullet is achieved. Furthermore, the present invention is able to detect and track a bullet regardless of the direction in which the bullet is heading. In addition, the present invention is able to detect and track a bullet even when the bullet is several hundred meters away and even if the bullet is not fired towards staring array passive infrared detector 10 of FIG. 1.

Figure 4:
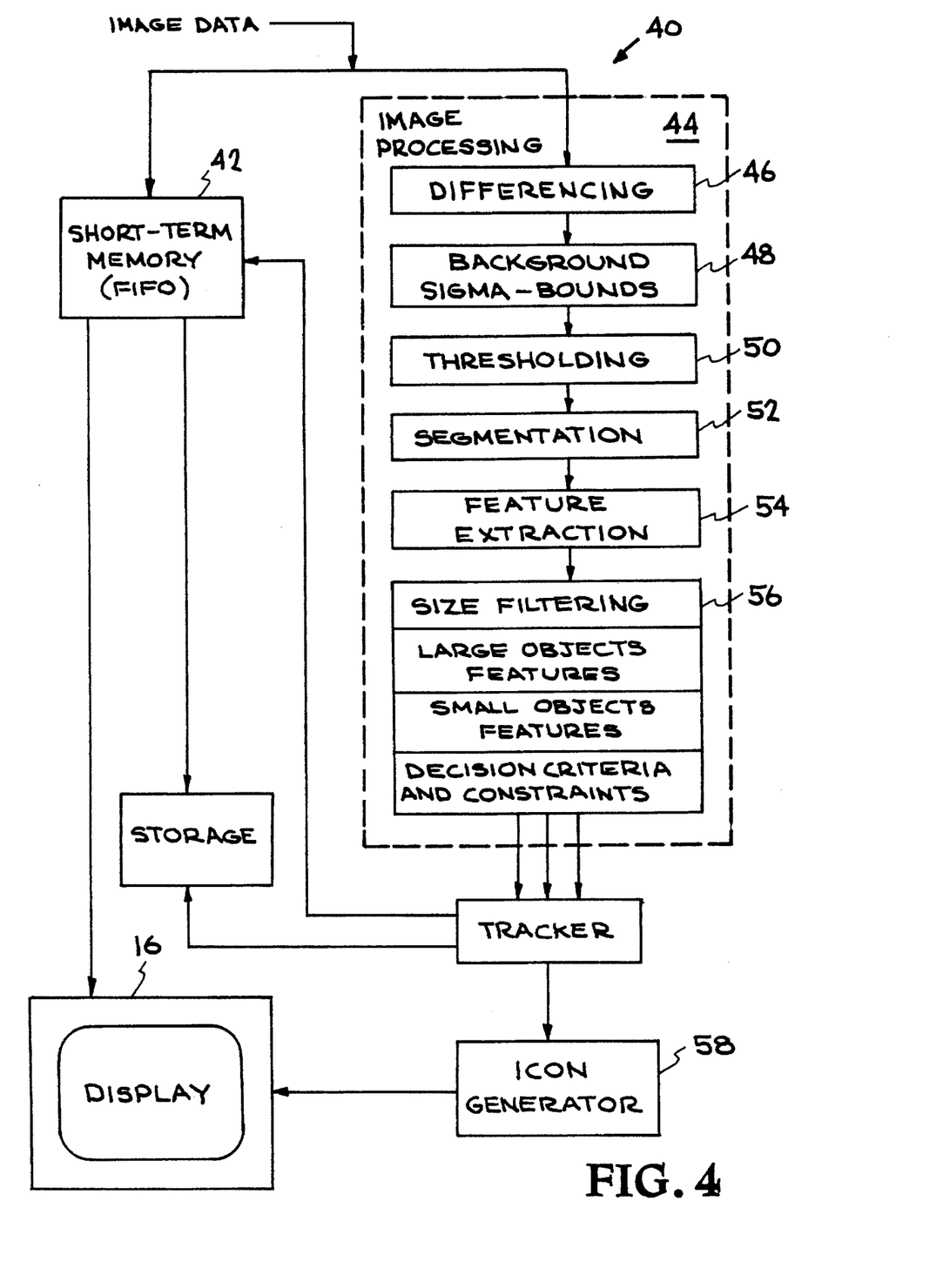
FIG. 4 is a block diagram of the processing flow of data received by the processor of FIG. 1 in accordance with the present invention.

With reference next to FIG. 4, a block diagram 40 of the processing flow of data received by data processor 14 of FIG. 1 is shown. As shown in FIG. 4, images received in the form of image data from staring array passive infrared detector 10 of FIG. 1 are recorded in short term memory (FIFO) 42. Additionally, data processor 14 of FIG. 1 employs processing circuitry 44 containing differencing 46, background sigma-bounds 48, thresholding 50, segmentation 52, feature extraction 54, and size filtering 56 circuitry for suppressing background radiation by subtracting from each successive image the previously observed and recorded image of the same region and recognizing the bullet in the images which remain after subtraction. Image processor 14 further employs an icon generator 58 which then sends an image representing the path of bullet 18 of FIG. 1 to display unit 16. Also, image processing circuitry 44 of data processor 14 of FIG. 1 is able to determine the origin of the path of bullet 18 of FIG. 1 by using a backward temporal projection along the path of bullet 18. Additionally, where multiple bullets are fired, the present invention is able to rapidly determine the origin of the bullets by determining the point at which the two bullet paths intersect.

With reference again to FIG. 4, the present invention is able to detect and track the angular position of bullet 18 of FIG. 1 is numerous ways. In one embodiment, data processor 14 includes computational circuitry which utilizes a mathematical model analysis to calculate the path of bullet 18 based upon the bullet's angular position at a different times. In above-mentioned embodiment including computational circuitry utilizing a mathematical model analysis to calculate the path of bullet 18, a non-linear regression is performed on an initial state vector incorporating source location, time of fire, and weapon type. Two separate regressions, an Azimuth vs. Time and an Elevation vs. Azimuth, are used. Furthermore, the embodiment uses a recursive filter such as, for example, extended Kalman filtering to avoid a matrix inversion calculation. In so doing, the range or distance of a bullet from a passive infrared detector, and the path of a bullet in three dimensions, can be determined using a single passive infrared detector. Although extended Kalman filtering is used in the present embodiment, the present invention is also well suited to the use of other mathematical models based upon other filtering and estimation techniques.

With reference again to FIG. 4, the present invention is also able to determine other aspects of a fired bullet. These aspects include but are not limited to, the speed of the bullet, the muzzle velocity of the bullet, and ballistic properties such as, for example, ballistic drag coefficients.

With reference still to FIG. 4, in the present invention, by determining the range of a bullet from a detector and the path of the bullet, the range or distance of a bullet from a known target is readily determined. That is, not only is the present invention able to determine the path of a bullet and the range of the bullet from a detector, but the present invention is also able to determine the range or distance of the bullet from a known target at any given time using a single passive infrared detector.

Figure 5:
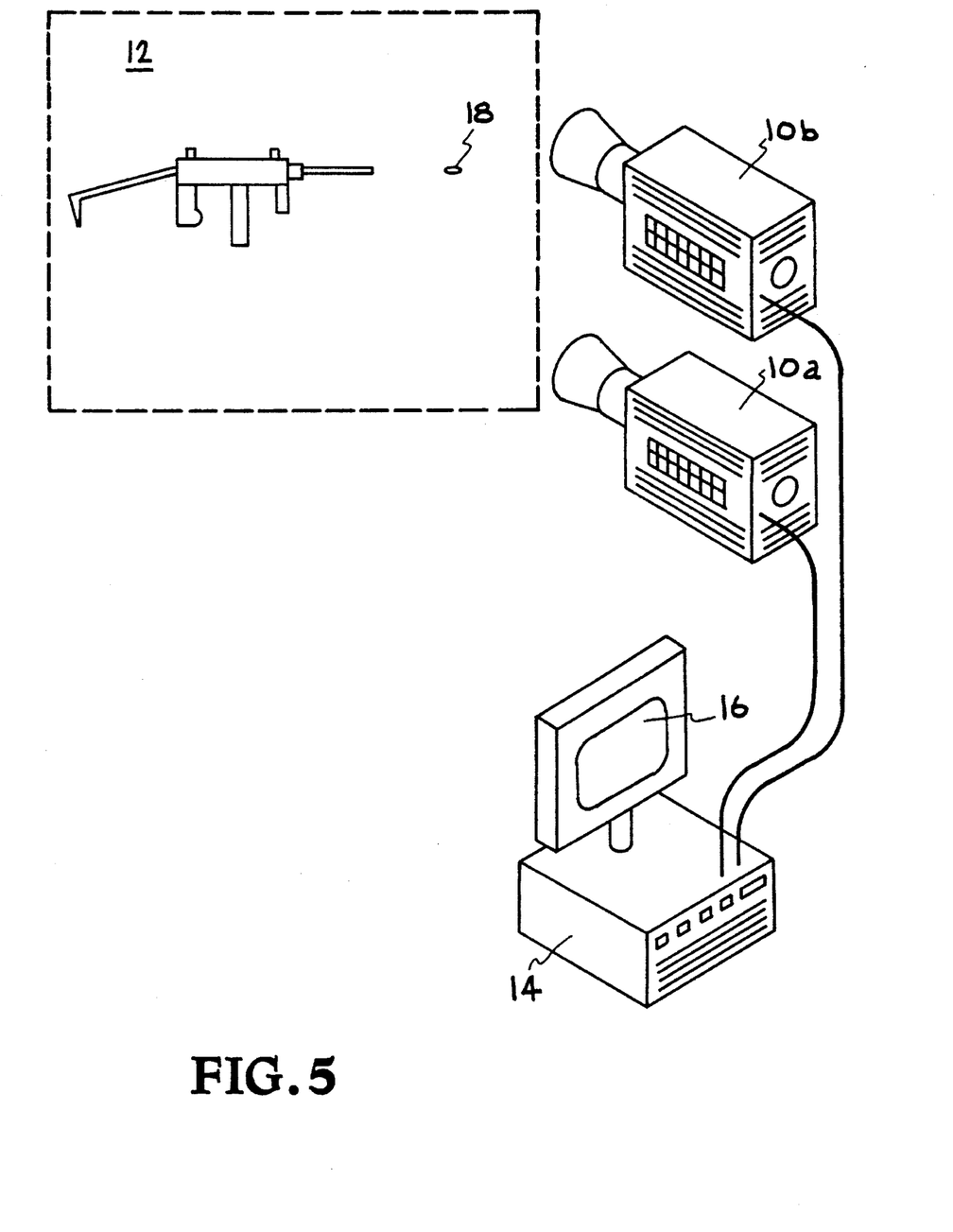
FIG. 5 is an illustration of another detector arrangement in which two passive infrared detectors focused onto a region in which a projectile is expected to be located in accordance with the present invention.

With reference next to FIG. 5, the present invention is also able to determine the precise range and path of a bullet by stereo observation of a region 12 in which bullet 18 is expected to be located. That is, by using at least two passive infrared detectors 10a and 10b, coupled to data processor 18, the range of bullet 18 from detectors 10a and 10b and the precise path of bullet 18 can be determined. Additionally, in the present embodiment, the range or distance of a bullet from a known target can be readily determined.

With reference again to FIG. 1, in yet another embodiment of the present invention, passive infrared detector 10 has accurate relative radiometric calibration. As a result, the position of bullet 18 within region 12 is determined by measuring the intensity of infrared radiation emitted from bullet 18. The precise path of bullet 18 is determined by measuring changes in the intensity of infrared radiation emitted from bullet 18 as bullet 18 passes travels through region 12.

With reference still to FIG. 1, the present invention provides several advantages over the prior art. By measuring the infrared radiation emitted from bullet 18, the present invention is able to determine range and position of bullet 18 regardless of the direction in which bullet 18 is heading. That, unlike the prior art, the detector 10 does not need to be behind bullet 18 to track the bullet's position. Furthermore, the present invention is able to detect and track bullet 18 even if bullet 18 is not fired towards detector 10 and even if no muzzle flash is observed by detector 10. As an additional advantage, due to the compression of air, bullet 18 is heated, and is therefore detectable and trackable, whether bullet 18 travels at subsonic or supersonic speeds. Thus, the present invention can be used to detect and track even slower bullets such those fired from handguns. Furthermore, because the present invention detects infrared radiation and not reflected radio waves as in radar, the present invention can not be "fooled" or rendered ineffective by radar invisible "stealth bullets. Thus, bullets cannot be "masked" from the present invention.

With reference again to FIG. 1, an additional advantage of the present invention is the ability of the invention to detect and track an unresolved point source. That is, at a distance of, for example, 200 meters from passive staring array infrared detector 10, each pixel thereof views a rectangular or square region of approximately 40 cm per side. Bullet 18, is obviously much smaller than the region viewed by a single pixel and is therefore referred to as an unresolved point source. However, by observing and recording successive images of the infrared radiation present in region 12 in which bullet 18 is expected to be located using passive staring array infrared detector 10, and further by suppressing background infrared radiation even an unresolved point source such as bullet 18 can be detected and tracked by the present invention.

Figure 6:
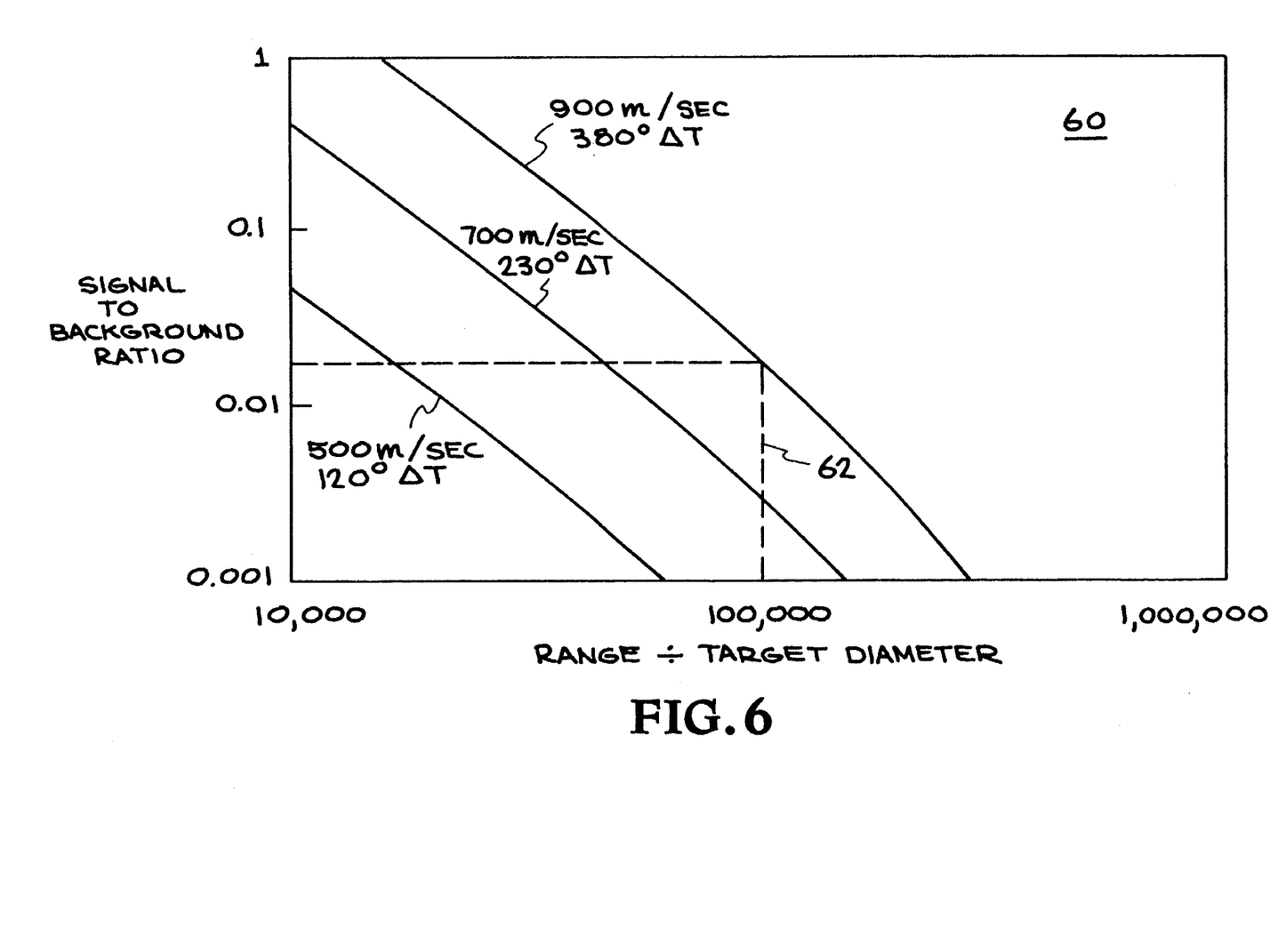
FIG. 6 is an experimentally prepared graph showing the distance at which a bullet can be detected and tracked under various conditions in accordance with the present invention.

With reference next to FIG. 6, an experimentally prepared graph 60 showing an additional advantage of the present invention, i.e. the great distance at which the present invention can detect and track bullets, is shown. Knowing the signal-to-background ratio and the speed and size of the bullet being fired, the range at which such a bullet will be first detected can be easily determined. For example, as shown in graph 60 of FIG. 6, with the signal-to-background ratio at 0.02, and with a rifle firing a 7.62 mm bullet at 900 m/sec, the intersection of line 62 with the x-coordinate of graph 60 gives a range/target diameter reading of 100,000. Thus, the range at which the present invention can detect a 7.62 mm bullet traveling at 900 m/sec is 100,000×7.62 mm or 762,000 mm. Thus, the present invention can detect such a bullet traveling under the conditions set forth above from as far as 762 meters. Thus, as set forth in experimentally prepared graph 60, the present invention is able to detect and track bullets even when the bullets are located great distances from the detector. By detecting a bullet while the bullet is still a great distance from the detector, the present invention provides time for evasive action.

Figure 7:
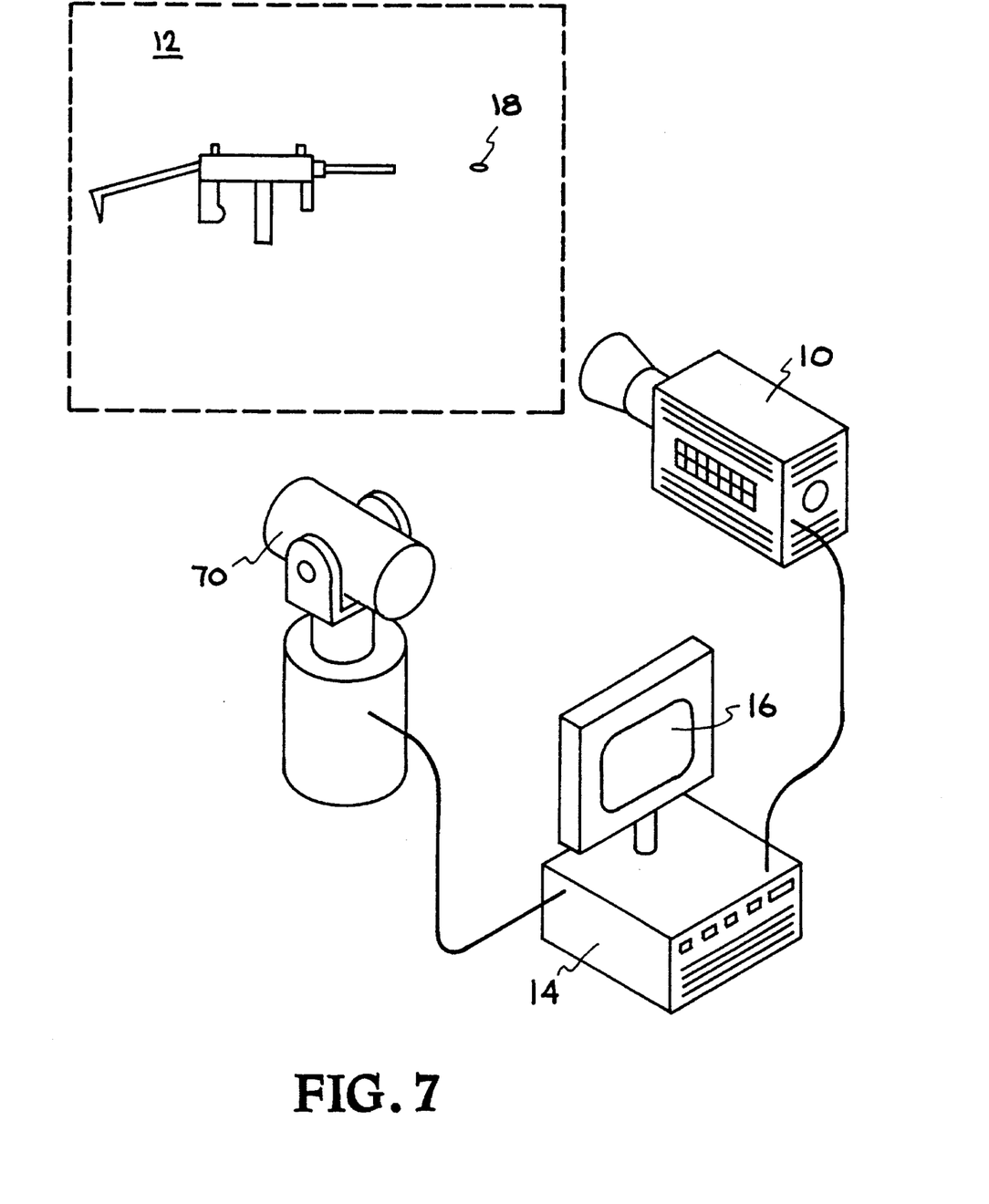
FIG. 7 is an illustration of the arrangement of FIG. 1 wherein a camera is coupled to a data processor in accordance with the present invention.

With reference next, to FIG. 7, another embodiment of the present invention is shown in which a camera 70 is coupled to data processor 14. Camera 70 is attached to a fast reacting servo motor, not shown which is able to quickly turn and focus camera 70 onto the desired area. Because the present invention is able to detect a bullet, and calculate the path an origin of a bullet within approximately 0.05 second, camera 70 can be used to photograph the area proximate to the origin of the bullet almost instantaneously after the bullet is fired. In so doing, the present invention can, for example, take a snapshot of a sniper before the sniper has time to flee, even if the sniper fires only a single bullet. In fact, the present invention is able to, for example, take a snapshot of a sniper within approximately 0.3 second after the bullet is fired. Although a camera 70 is coupled to data processor 14 in the present embodiment, the present invention is also well suited to coupling other devices such as, for example, a spotlight to data processor 14.

Figure 8:
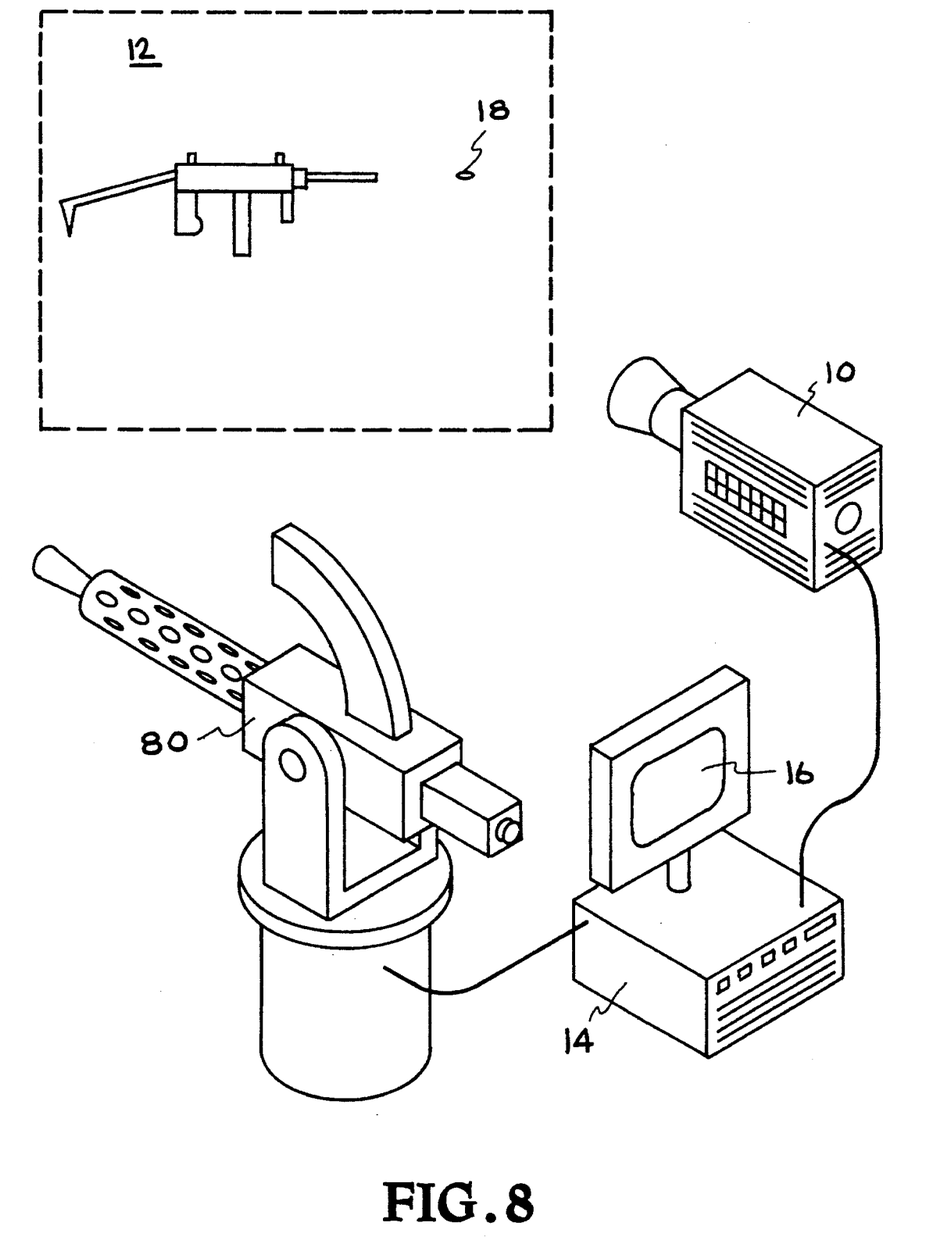
FIG. 8 is an illustration of the arrangement of FIG. 1 wherein a gimbal mounted gun is coupled to a data processor in accordance with the present invention.

With reference next to FIG. 8, another embodiment of the present invention is shown in which a gimbal mounted gun 80 is coupled to data processor 14. Gimbal mounted gun 80 is able to quickly turn and fire into the desired area. Because the present invention is able to detect a bullet, and calculate the path an origin of a bullet within approximately 0.05 second, gimbal mounted gun 80 can be used to fire bullets or other projectiles into the area proximate to the origin of bullet 18 almost instantaneously after bullet 18 is fired. In the present embodiment, the present invention can return fire at a sniper within approximately 0.3 second after the sniper fires a bullet. In so doing, the present invention can, for example, shoot and kill a sniper before the sniper has time to flee, even if the sniper fires only a single bullet. Although a gimbal mounted gun 80 is coupled to data processor 14 in the present embodiment, the present invention is also well suited to coupling other devices such as, for example, a tear gas launcher or other such weapon to data processor 14. Furthermore, the present invention is also well suited to coupling data processor 14 to a device for firing "unconventional" projectiles such as, for example, nets, water, gases, or immobilizing glue at the origin of the path of the bullet.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for passively detecting and determining the path of a projectile comprising the steps of:

observing and recording a plurality of first successive images of infrared radiation present in a region in which a projectile is expected to be located using at least one passive infrared detector, suppressing in each of said plurality of first successive images of said region background infrared radiation present in said region such that second successive images containing substantially only infrared radiation generated by said projectile as said projectile passes through said region are produced, and calculating the path of said projectile by using said second successive images of infrared radiation generated by said projectile.

2. The method as recited in claim 1 wherein said step of observing and recording first successive images further comprises using at least one staring array passive infrared detecter.

3. The method as recited in claim 1 wherein said step of observing and recording first successive images further comprises using a single staring array passive infrared detector having accurate relative radiometric calibration.

4. The method as recited in claim 1 wherein said step of observing and recording first successive images further comprises observing and recording images at a frame rate in the range of approximately 200 frames per second.

5. The method as recited in claim 1 wherein said step of observing and recording first successive images further comprises observing and recording images with an exposure rate in the range of approximately 1 millisecond.

6. The method as recited in claim 1 wherein said step of observing and recording first successive images further comprises observing and recording mid wave infrared radiation.

7. The method as recited in claim 1 wherein said step of observing and recording first successive images further comprises observing and recording first successive images of infrared radiation when said at least one passive infrared detector is located at least several hundred yards from said region.

8. The method as recited in claim 1 wherein said step of suppressing in each of said first successive images of said region background infrared radiation produces second successive images of infrared radiation generated by a bullet passing through said region.

9. The method as recited in claim 8 wherein said step of suppressing in each of said first successive images of said region background infrared radiation produces second successive images of infrared radiation generated by a bullet passing through said region at a supersonic speed.

10. The method as recited in claim 8 wherein said step of suppressing in each of said first successive images of said region background infrared radiation produces second successive images of infrared radiation generated by a bullet passing through said region at a subsonic speed.

11. The method as recited in claim 8 wherein said step of suppressing in each of said first successive images of said region background infrared radiation produces second successive images of infrared radiation generated by said bullet wherein said bullet is located several hundred meters from said at least one passive infrared detector.

12. The method as recited in claim 1 wherein said step of suppressing in each of said first successive images of said region background infrared radiation further comprises subtracting from each of said plurality of first successive images of said region a previously observed and recorded image of said region, such that said background infrared radiation present in said region is canceled out leaving only said second successive images of infrared radiation generated by said projectile as said projectile passes through said region.

13. The method as recited in claim 1 wherein said step of calculating the path of said projectile by using said second successive images of infrared radiation generated by said projectile further comprises determining the distance of said projectile from said at least one passive infrared detector.

14. The method as recited in claim 1 wherein said step of calculating the path of said projectile by using said second successive images of infrared radiation generated by said projectile further comprises determining the distance of said projectile from a target at which said projectile is aimed.

15. The method as recited in claim 1 wherein said step of calculating the path of said projectile by using said second successive images of infrared radiation generated by said projectile further comprises using a mathematical model to determine said path of said projectile.

16. The method as recited in claim 1 further including the steps of:

displaying said path of said projectile on display means.

17. The method as recited in claim 1 further including the steps of:

determining from said path of said projectile, the origin of said path of said projectile.

18. The method as recited in claim 17 further including the steps of:

photographing the area proximate to said origin of said path of said projectile.

19. The method as recited in claim 17 further including the steps of:

firing at least one second projectile into the area proximate to said origin of said path of said projectile.

20. A passive infrared projectile detection and projectile path determining apparatus comprised of:

at least one passive infrared detector focused onto a region in which a projectile is expected to be located, image recording means coupled to said at least one passive infrared detector for recording a plurality of first successive images of infrared radiation present in said region, background infrared radiation suppression means coupled to said at least one passive infrared detector for suppressing in each of said plurality of first successive images of said region background infrared radiation present in said region such that second successive images containing substantially only infrared radiation generated by said projectile as said projectile passes through said region are produced, and calculating means coupled to said background infrared radiation suppression means for determining the path of said projectile by using said second successive images of infrared radiation generated by said projectile.

21. The passive infrared projectile detection and projectile path determining apparatus of claim 20 wherein said at least one passive infrared detector is comprised of at least one staring array passive infrared detector.

22. The passive infrared projectile detection and projectile path determining apparatus of claim 20 wherein said at least one passive infrared detector is comprised of a single staring array passive infrared detector having accurate relative radiometric calibration.

23. The passive infrared projectile detection and projectile path determining apparatus of claim 20 wherein said at least one passive infrared detector is disposed at least several hundred yards from said region in which said projectile is expected to be located.

24. The passive infrared projectile detection and projectile path determining apparatus of claim 20 wherein said at least one passive infrared detector detects mid wave infrared radiation.

25. The passive infrared projectile detection and projectile path determining apparatus of claim 20 wherein said image recording means records said plurality of first successive images of infrared radiation present in said region at a frame rate in the range of approximately 200 frames per second.

26. The passive infrared projectile detection and projectile path determining apparatus of claim 20 wherein said image recording means records said plurality of first successive images of infrared radiation present in said region with an exposure rate in the range of approximately 1 millisecond.

27. The passive infrared projectile detection and projectile path determining apparatus of claim 20 wherein said background infrared radiation suppression means further includes means for subtracting from each of said plurality of first successive images of said region a previously observed and recorded image of said region, such that said background infrared radiation present in said region is canceled out leaving only said second successive images of infrared radiation generated by said projectile as said projectile passes through said region.

28. The passive infrared projectile detection and projectile path determining apparatus of claim 20 wherein said projectile is a bullet.

29. The passive infrared projectile detection and projectile path determining apparatus of claim 28 wherein said second successive images of infrared radiation are generated by said bullet as said bullet passes through said region at a supersonic speed.

30. The passive infrared projectile detection and projectile path determining apparatus of claim 28 wherein said second successive images of infrared radiation are generated by said bullet as said bullet passes through said region at a subsonic speed.

31. The passive infrared projectile detection and projectile path determining apparatus of claim 28 wherein said second successive images of infrared radiation are generated by said bullet wherein said bullet is located several hundred meters from said at least one passive infrared detector.

32. The passive infrared projectile detection and projectile path determining apparatus of claim 20 wherein said calculating means further includes means for determining the distance of said projectile from said at least one passive infrared detector.

33. The passive infrared projectile detection and projectile path determining apparatus of claim 20 wherein said calculating means further includes means for determining the distance of said projectile from a target at which said projectile is aimed.

34. The passive infrared projectile detection and projectile path determining apparatus of claim 20 wherein said calculating means further comprises computational means employing a mathematical model for determining the path of said projectile.

35. The passive infrared projectile detection and projectile path determining apparatus of claim 20 further comprising:
origin locating means coupled to said calculating means for determining from said path of said projectile, the origin of said path of said projectile.

36. The passive infrared projectile detection and projectile path determining apparatus of claim 34 further comprising:
display means coupled to said calculating means for graphically displaying said path of said projectile.

37. The passive infrared projectile detection and projectile path determining apparatus of claim 34 further comprising:
photographing means coupled to said calculating means for photographing the area proximate to said origin of said path of said projectile.

38. The passive infrared projectile detection and projectile path determining apparatus of claim 34 further comprising:
firing means coupled to said calculating means for firing at least one second projectile into the area proximate to said origin of said path of said projectile.

39. An apparatus for passive infrared detection and determining the path of a projectile comprising:
at least one passive infrared detector focused onto a region in which a projectile is expected to be located,
an image recorder coupled to said at least one passive infrared detector, said image recorder recording a plurality of first successive images of infrared radiation present in said region which are observed by said at least one passive infrared detector,
a background infrared radiation suppressor coupled to said image recorder, said background infrared radiation suppressor suppressing from each of said plurality of first successive images of said region background infrared radiation present in said region such that second successive images containing substantially only infrared radiation generated by said projectile as said projectile passes through said region, and
a projectile path calculator coupled to said background infrared radiation suppressor, said projectile path calculator determining the path of said projectile by using said second successive images of infrared radiation generated by said projectile.

40. The passive infrared projectile detection and path determining apparatus of claim 39 wherein said at least one passive infrared detector is comprised of at least one staring array passive infrared detector.

41. The passive infrared projectile detection and path determining apparatus of claim 40 wherein said at least one passive infrared detector is comprised of a single staring array passive infrared detector having accurate relative radiometric calibration.

42. The passive infrared projectile detection and path determining apparatus of claim 39 wherein said at least one passive infrared detector is disposed at least several hundred yards from said region in which said projectile is expected to be located.

43. The passive infrared projectile detection and path determining apparatus of claim 39 wherein said at least one passive infrared detector detects mid wave infrared radiation.

44. The passive infrared projectile detection and path determining apparatus of claim 39 wherein said image recorder records said plurality of first successive images of infrared radiation present in said region at a frame rate in the range of approximately 200 frames per second.

45. The passive infrared projectile detection and path determining apparatus of claim 39 wherein said image recorder records said plurality of first successive images of infrared radiation present in said region with an exposure rate in the range of approximately 1 millisecond.

46. The passive infrared projectile detection and path determining apparatus of claim 39 wherein said background infrared radiation suppressor further includes an image subtractor, said image subtractor subtracting from each of said plurality of first successive images of said region a previously observed and recorded image of said region, such that said background infrared radiation present in said region is canceled out leaving only said second successive images of infrared radiation generated by said projectile as said projectile passes through said region.

47. The passive infrared projectile detection and path determining apparatus of claim 39 wherein said projectile is a bullet.

48. The passive infrared projectile detection and path determining apparatus of claim 47 wherein said second successive images of infrared radiation are generated by said bullet as said bullet passes through said region at a supersonic speed.

49. The passive infrared projectile detection and path determining apparatus of claim 47 wherein said second successive images of infrared radiation are generated by said bullet as said bullet passes through said region at a subsonic speed.

50. The passive infrared projectile detection and path determining apparatus of claim 47 wherein said second successive images of infrared radiation are generated by said bullet wherein said bullet is located several hundred meters from said at least one passive infrared detector.

51. The passive infrared projectile detection and path determining apparatus of claim 39 wherein said projectile path calculator further comprises a range finder, said range finder determining the distance of said projectile from said at least one passive infrared detector.

52. The passive infrared projectile detection and path determining apparatus of claim 51 wherein said range finder determines the distance of said projectile from a target at which said projectile is aimed.

53. The passive infrared projectile detection and path determining apparatus of claim 39 wherein said projectile path calculator further comprises a mathematical model calculator, said mathematical model calculator determining the path of said projectile using a mathematical model.

54. The passive infrared projectile detection and path determining apparatus of claim 39 further comprising:
an origin locator coupled to said projectile path calculator, said origin locator determining from said path of said projectile, the origin of said path of said projectile.

55. The passive infrared projectile detection and path determining apparatus of claim 54 further comprising:

a display unit coupled to said projectile path calculator, said display unit graphically displaying said path of said projectile.

56. The passive infrared projectile detection and path determining apparatus of claim 54 further comprising:

a camera coupled to said projectile path calculator, said camera photographing the area proximate to said origin of said path of said projectile.

57. The passive infrared projectile detection and path determining apparatus of claim 54 further including the steps of:

a second projectile launcher coupled to said projectile path calculator, said second projectile launcher firing at least one second projectile into the area proximate to said origin of said path of said projectile.

58. An apparatus for passive infrared detection and determining of a path of a bullet comprising:

at least one staring array passive infrared detector focused onto a region in which a bullet is expected to be located, said at least one staring array passive infrared detector disposed at least several hundred yards from said region in which said bullet is expected to be located, said at least one staring array passive infrared detector detecting mid wave infrared radiation, an image recorder coupled to said at least one staring array passive infrared detector, said image recorder recording a plurality of first successive images of infrared radiation present in said region which are observed by said at least one staring array passive infrared detector, said image recorder recording said plurality of first successive images at a frame rate in the range of approximately 200 frames per second and with an exposure rate in the range of approximately 1 millisecond, a background infrared radiation suppressor coupled to said image recorder, said background infrared radiation suppressor suppressing in each of said plurality of first successive images of said region background infrared radiation present in said region such that second successive images containing substantially only infrared radiation generated by said bullet as said bullet passes through said region are produced, a bullet path calculator coupled to said background infrared radiation suppressor, said bullet path calculator determining the path of said bullet by using said second successive images of infrared radiation generated by said bullet, said bullet path calculator further comprising;

a range finder, said range finder determining the distance of said bullet from said at least one staring array passive infrared detector, and an origin locator coupled to said bullet path calculator, said origin locator determining from said path of said bullet the origin of said path of said bullet, a display unit coupled to said bullet path calculator, said display unit graphically displaying said path of said bullet, a camera coupled to said bullet path calculator, said camera photographing the area proximate to said origin of said path of said bullet, and a projectile launcher coupled to said bullet path calculator, said projectile launcher firing at least one projectile into the area proximate to said origin of said path of said bullet.

59. The passive infrared bullet detection and path determining apparatus of claim 58 wherein said at least one staring array passive infrared detector has accurate relative radiometric calibration.

60. The passive infrared bullet detection and path determining apparatus of claim 58 wherein said second successive images of infrared radiation are generated by said bullet as said bullet passes through said region at a supersonic speed.

61. The passive infrared bullet detection and path determining apparatus of claim 58 wherein said second successive images of infrared radiation are generated by said bullet as said bullet passes through said region at a subsonic speed.

62. The passive infrared bullet detection and path determining apparatus of claim 58 wherein said second successive images of infrared radiation are generated by said bullet wherein said bullet is located several hundred meters from said at least one passive infrared detector.

63. The passive infrared bullet detection and path determining apparatus of claim 58 wherein said background infrared radiation suppressor further includes an image subtractor, said image subtractor subtracting from each of said plurality of first successive images of said region a previously observed and recorded image of said region, such that said background infrared radiation present in said region is canceled out leaving only said second successive images of infrared radiation generated by said bullet as said bullet passes through said region.

64. The passive infrared bullet detection and path determining apparatus of claim 58 wherein said range finder further comprises:

a target distance determiner, said target distance determiner calculating the distance of said bullet from a target at which said bullet is aimed.

65. The passive infrared bullet detection and path determining apparatus of claim 58 wherein said range finder further comprises:

a mathematical model calculator, said mathematical model calculator determining the path of said bullet using a mathematical model.

\* \* \* \* \*